(12) United States Patent
Nakamura

(10) Patent No.: US 8,235,856 B2
(45) Date of Patent: Aug. 7, 2012

(54) GEAR DEVICE AND TURNING PORTION STRUCTURE OF INDUSTRIAL ROBOT USING THE GEAR DEVICE

(75) Inventor: Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 384 days.

(21) Appl. No.: 12/671,319

(22) PCT Filed: Jul. 30, 2008

(86) PCT No.: PCT/JP2008/063635
§ 371 (c)(1),
(2), (4) Date: Jan. 29, 2010

(87) PCT Pub. No.: WO2009/017143
PCT Pub. Date: Feb. 5, 2009

(65) Prior Publication Data
US 2010/0199796 A1 Aug. 12, 2010

(30) Foreign Application Priority Data

Jul. 31, 2007 (JP) ................................. 2007-198466

(51) Int. Cl.
*F16H 1/32* (2006.01)
(52) U.S. Cl. ...................................................... 475/168
(58) Field of Classification Search .................. 475/162, 475/168, 178
See application file for complete search history.

(56) References Cited

U.S. PATENT DOCUMENTS 5,609,539 A * 3/1997 Herstek et al. ................ 475/168
(Continued)

FOREIGN PATENT DOCUMENTS

JP 09057678 A 3/1997
(Continued)

OTHER PUBLICATIONS

Extended EP Search Report issued Jun. 24, 2011 in EP Application No. 08791866.0.

*Primary Examiner* — Edwin A Young
(74) *Attorney, Agent, or Firm* — Panitch Schwarze Belisario & Nadel LLP

(57) ABSTRACT

A gear device includes: an input gear fixed to an output shaft of a motor; an internal gear; an external gear which rotates while revolving around a central axis of the internal gear while meshing with the internal gear; a carrier supported rotatably within the internal gear and adapted to rotate about the central axis of the internal gear in conjunction with the rotation of the external gear; a plurality of crankshafts which are rotatably supported by the carrier and are adapted to cause the external gear to revolve around the central axis of the internal gear; transmission gears each provided on a central portion of each of the crankshafts; and a cylindrical gear which meshes with the transmission gears of the crankshafts and to which rotation is transmitted from the input gear, wherein the cylindrical gear is located on a radially inner side of an imaginary line passing through a center of rotation of each crankshaft and is rotatably supported by the carrier, and wherein the input gear and the cylindrical gear mesh with each other in an axially central portion of the carrier.

7 Claims, 6 Drawing Sheets

U.S. PATENT DOCUMENTS

| | | | |
|---|---|---|---|
| 2004/0254041 A1* | 12/2004 | Becker et al. | 475/162 |
| 2005/0255955 A1* | 11/2005 | Arakawa et al. | 475/162 |
| 2007/0202981 A1* | 8/2007 | Sugiura et al. | 475/162 |
| 2007/0232433 A1 | 10/2007 | Haga et al. | |
| 2010/0261567 A1 | 10/2010 | Kurita et al. | |

FOREIGN PATENT DOCUMENTS

| | | |
|---|---|---|
| JP | 2006046664 A | 2/2006 |
| JP | 2006226370 A | 8/2006 |
| JP | 2007056897 A | 3/2007 |
| WO | 2007032400 A1 | 3/2007 |

* cited by examiner

GEAR DEVICE AND TURNING PORTION STRUCTURE OF INDUSTRIAL ROBOT USING THE GEAR DEVICE

CROSS-REFERENCE TO RELATED APPLICATION

This application is a section 371 of International Application No. PCT/JP2008/063635, filed Jul. 30, 2008, which was published in the Japanese language on May 2, 2009 under International Publication No. WO 2009/017143 A1 and the disclosure of which is incorporated herein by reference.

TECHNICAL FIELD

The present invention relates to a gear device for use in such as a turning portion of an industrial robot.

BACKGROUND ART

As a conventional turning portion structure of an industrial robot, one described in the following patent document 1 is known, for example.

Patent Document 1: JP-A-9-57678

This turning portion structure of an industrial robot is comprised of a fixed member; a rotating member; a reduction gear of an eccentric differential type which is disposed between the fixed member and the rotating member, has a plurality of crankshafts, reduces the speed of the rotational driving force imparted to the crankshafts and transmits it to the rotating member so as to rotate the rotating member; a motor mounted on the rotating member; a first transmitting member fixed to an output shaft of the motor; a second transmitting member fixed to a particular one of the crankshafts and adapted to receive the rotational driving force directly from the first transmitting member so as to rotate the particular crankshaft; a cylindrical gear which rotates by receiving the rotational driving force from the second transmitting member; and an external gear fixed to the crankshafts other than the particular crankshaft and adapted to mesh with the cylindrical gear to thereby rotate the crankshafts.

DISCLOSURE OF THE INVENTION

With such a conventional turning portion structure of an industrial robot, since the driving force from the motor is transmitted only to a particular crankshaft, that particular crankshaft alone is elongated toward the rotating member side, and the driving force from the motor is transmitted to a distal end portion of that crankshaft through gears or a pulley. For this reason, the position of the motor is distanced from the reduction gear, and the mounting position of the motor to the rotating member is made high. Accordingly, the center of gravity of the rotating member becomes high, which has not been desirable for the turning portion of the robot.

In addition, since the shape differs between the particular crankshaft and the remaining crankshafts, two kinds of crankshaft are required, so that the number of component parts is large, resulting in a higher cost.

An object of the present invention is to provide a stable turning portion structure in which the center of gravity of the rotating member is low by making the gear device compact and using it for the turning portion structure of a robot.

MEANS FOR OVERCOMING THE PROBLEMS

A gear device in accordance with a first aspect of the invention comprises: an input gear fixed to an output shaft of a motor and disposed by being distanced from a central axis; an internal gear; an external gear which rotates while revolving around a central axis of the internal gear while meshing with the internal gear; a carrier supported rotatably within the internal gear and adapted to rotate about the central axis of the internal gear in conjunction with the rotation of the external gear; a plurality of crankshafts which are rotatably supported by the carrier and are adapted to cause the external gear to revolve around the central axis of the internal gear; transmission gears each provided on a central portion of each of the crankshafts; and a cylindrical gear which meshes with the transmission gears of the crankshafts and to which rotation is transmitted from the input gear, wherein the cylindrical gear is located on a radially inner side of an imaginary line passing through a center of rotation of each crankshaft and is rotatably supported by the carrier, and wherein the input gear and the cylindrical gear are disposed in an axially central portion of the carrier, and the rotation is transmitted from the input gear to the cylindrical gear.

Further, as a second aspect of the invention, an intermediate gear which is rotatably supported by the carrier is disposed so as to mesh with the input gear and the cylindrical gear.

Further, as a third aspect of the invention, the intermediate gear is constituted by a shaft fixed to the carrier and a gear disposed rotatably around the shaft.

Further, as a fourth aspect of the invention, an oil seal is provided between the input gear and the carrier.

Further, as a fifth aspect of the invention, a protective tube whose both ends are fixed to the carrier is provided inside the cylindrical gear.

Further, as a sixth aspect of the invention, a recessed portion is formed on an opposing surface side of the external gear, and the cylindrical gear is accommodated in a space surrounded by the recessed portion.

Further, as a seventh aspect of the invention, a turning portion structure of an industrial robot comprises: a fixed member and a rotating member which are connected to each other relatively rotatably through the gear device; and the motor for relatively rotating the fixed member and the rotating member through the gear device, wherein the motor is fixed to the rotating member at a position offset from the rotational center of the relative rotation, the internal gear of the gear device is fixed to the fixed member, and the carrier of the gear device is fixed to the rotating member.

ADVANTAGES OF THE INVENTION

According to the first aspect of the invention, the overall gear device can be made compact since the input gear fixed to the output shaft of the motor is in the form of having entered an axially central portion of the gear device.

According to the second aspect of the invention, since the output shaft of the motor can be further offset radially outward, the gear device can be made such that the central hole can be made even larger.

According to the third aspect of the invention, the supporting structure of the intermediate gear can be made inexpensive.

According to the fourth aspect of the invention, it is possible to prevent the ingress of a lubricant from the gear device to the motor side.

According to the fifth aspect of the invention, it is possible to prevent the ingress of the lubricant into the hollow hole provided in the gear device.

According to the sixth aspect of the invention, the overall gear device can be made compact.

According to the seventh aspect of the invention, it is possible to provide a stable turning portion structure in which the rotating member is compact and the center of gravity is low.

Figure 1:
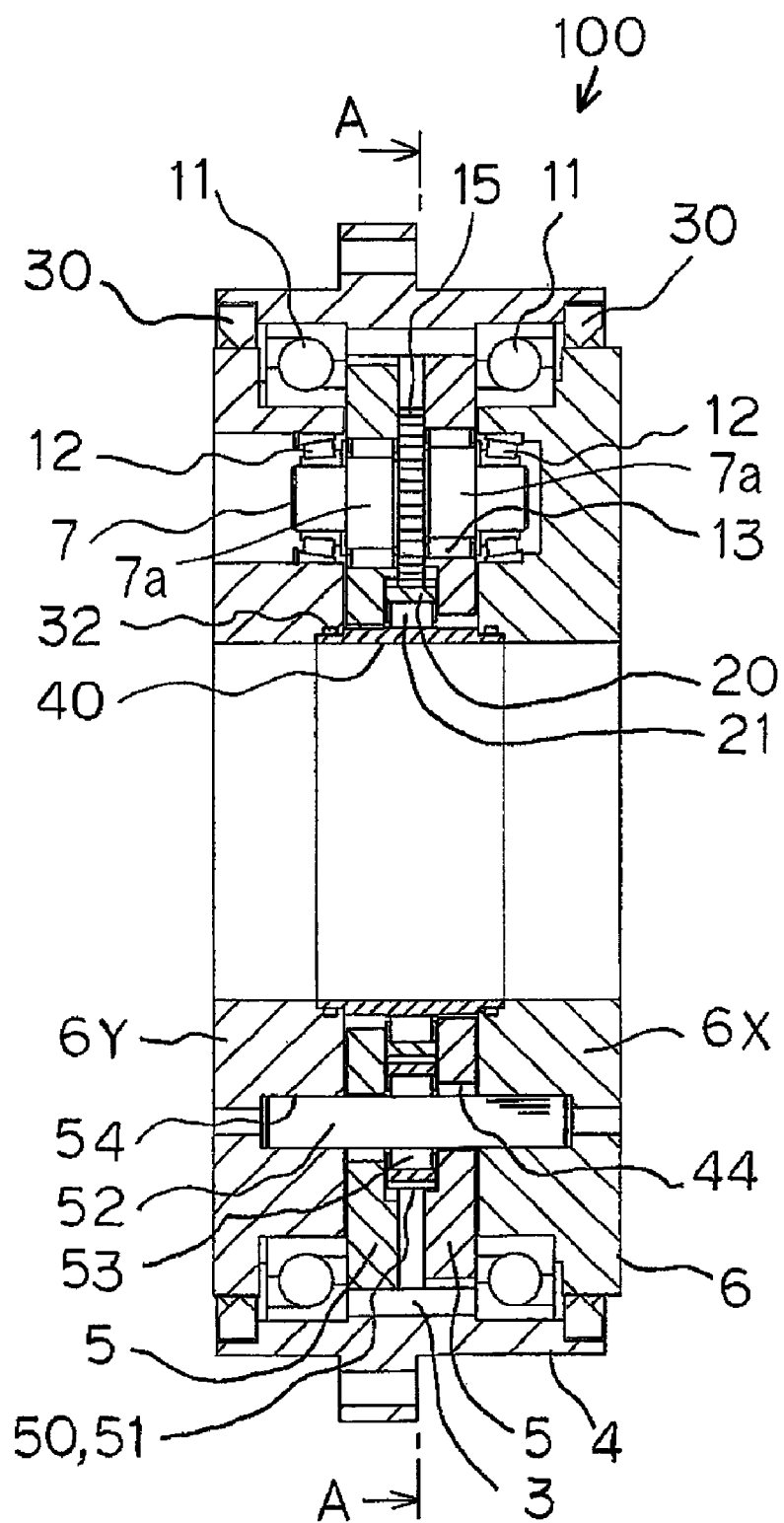
FIG. 1 is a cross-sectional view of a first embodiment in accordance with the invention.
Figure 2:
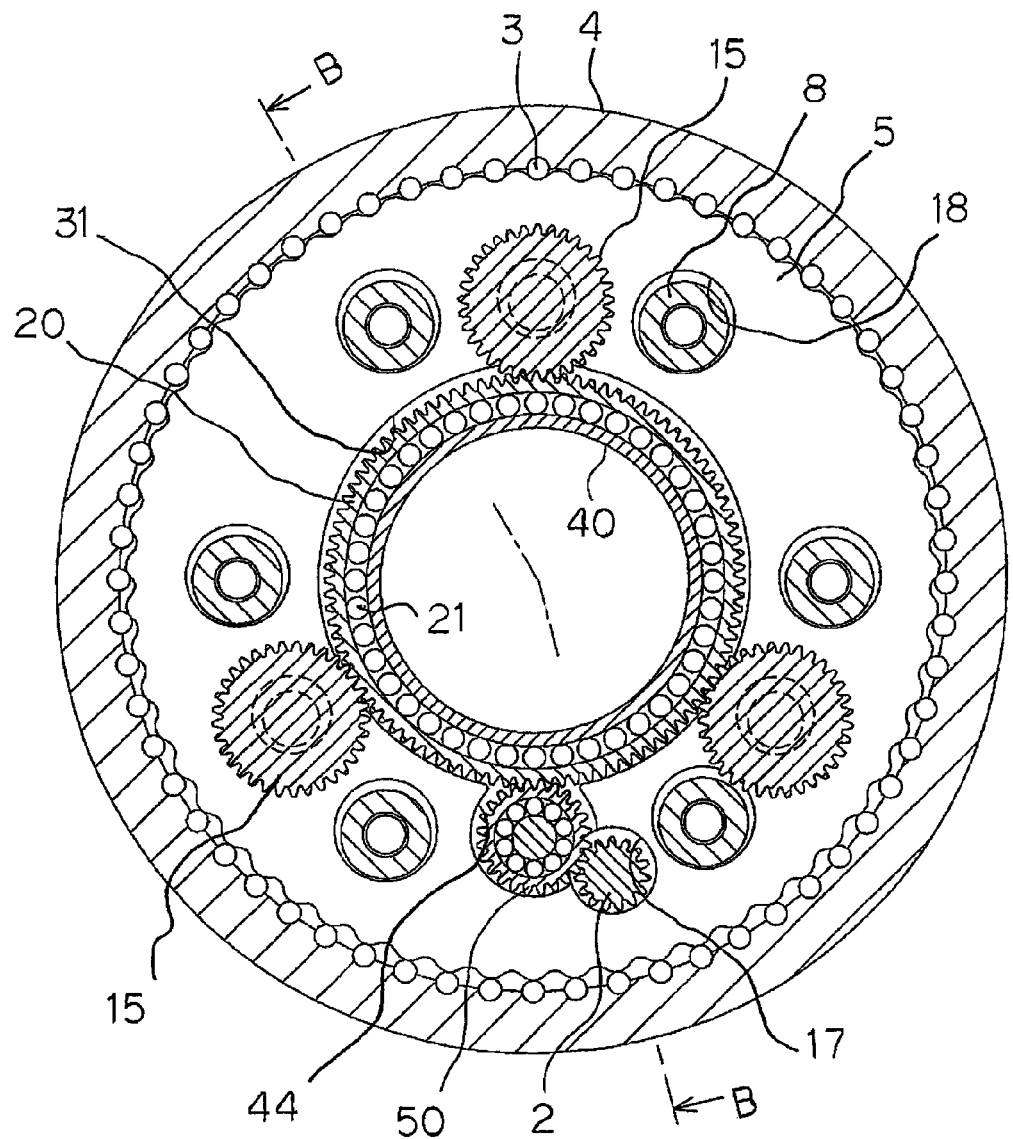
FIG. 2 is a cross-sectional view taken along A-A in FIG. 1.
Figure 3:
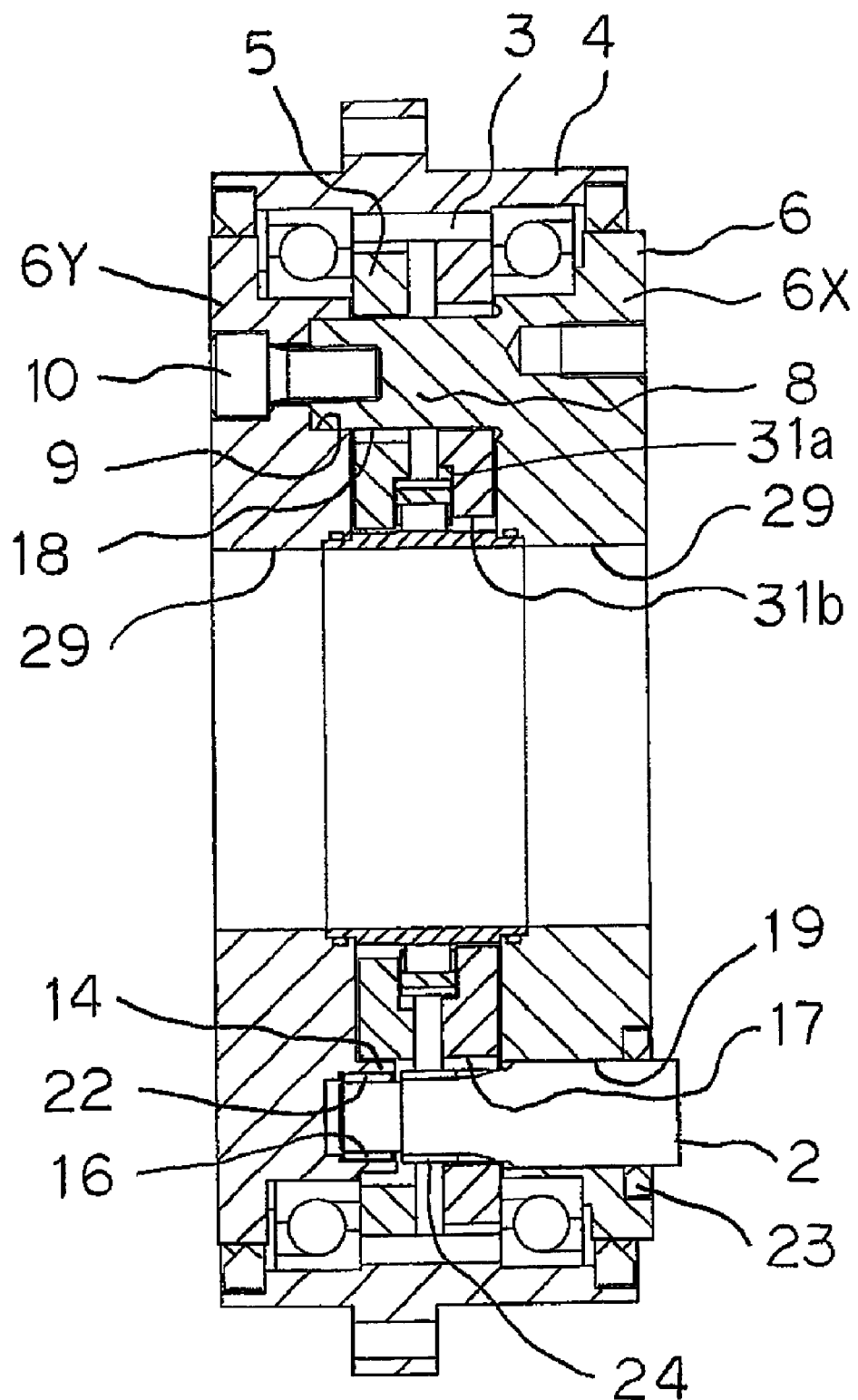
FIG. 3 is a cross-sectional view taken along B-B in FIG. 2.

BEST MODE FOR CARRYING OUT THE INVENTION (First Embodiment)

Referring now to the drawings, a description will be given of a first embodiment of the invention.

In FIGS. 1 to 5, a gear device 100 of an eccentrically rocking type is comprised of an input gear 2 fixed to an output shaft of a motor 1 (see FIG. 5) and disposed by being distanced from a central axis; an internal gear 4 having inner teeth consisting of a plurality of pins 3; two external gears 5 which rotate while revolving around a central axis of the internal gear 4 while meshing with the internal gear 4; a carrier 6 supported rotatably within the internal gear 4 through a pair of angular ball bearings 11 and adapted to rotate about the central axis of the internal gear 4 in conjunction with the rotation of the external gears 5; a plurality of crankshafts 7 each of which is rotatably supported by the carrier 6 through a pair of tapered roller bearings 12 and has a pair of crank portions 7a respectively accommodated in through holes formed in the external gears 5, the plurality of crankshafts 7 being adapted to cause the external gears 5 to revolve around the central axis of the internal gear 4; transmission gears 15 each provided on a central portion (an axially central portion) between the pair of crank portions 7a of each crankshaft 7; and a cylindrical gear 20 which meshes with the transmission gears 15 of the respective crankshafts 7 and to which rotation is transmitted from the input gear 2.

The carrier 6 consists of a pair of end plate portions 6X and 6Y in such a manner as to sandwich the external gears 5. A plurality of (six) column portions 8 are integrally formed on one end plate portion 6X, end portions of the column portions 8 are respectively inserted in holes 9 formed in the other end plate portion 6Y and are fixed by bolts 10 so as to constitute the carrier 6.

The number of teeth of each external gear 5 is slightly (by one to five) less than the number of the inner teeth of the internal gear 4. In this embodiment, the number of teeth of the external gear 5 is less than the number of the inner teeth of the internal gear 4 by one. A through hole 17 and a plurality of through holes 18 are formed in each external gear 5 in its axial direction in such a manner as to be radially distanced from the center. The input gear 2 is loosely fitted in the through hole 17, and the respective column portions 8 are loosely fitted in the respective through holes 18.

Three crankshafts are provided as the crankshafts 7 by being radially distanced from the center of the internal gear 4.

Hollow holes 29 and 31 are formed in respective central portions (radially central portions) of the pair of end plate portions 6X and 6Y and the external gears 5. A protective tube 40 formed of a steel material is loosely fitted in the hollow holes 31 of the external gears 5 and is mounted in the hollow hole 29 of the carrier 6 with O-rings sandwiched therebetween. The single cylindrical gear 20 is located on the radially inner side of an imaginary line passing through the center of rotation of each crankshaft 7, and that cylindrical gear meshes with the transmission gears 15 of the respective crankshafts, an inner periphery thereof being rotatably supported by the protective tube 40 by means of a cylindrical roller bearing 21. Accordingly, the cylindrical gear 20 is supported rotatably by the carrier 6 through the cylindrical roller bearing 21 and the protective tube 40. It should be noted that the hollow holes 31 of the external gears 5 are stepped hollow holes each consisting of a large-diameter portion 31a and a small-diameter portion 31b, such that recessed portions formed by the large-diameter portions 31a are formed on opposing surface sides of the pair of external gears 5 in such a manner as to face each other. The cylindrical gear 20 is accommodated in a space surrounded by these recessed portions. In this embodiment, although the cylindrical gear 20 is formed with a larger wall thickness than the transmission gears 15, as the cylindrical gear 20 is accommodated in the space surrounded by the two recessed portions formed on the external gears 5, the axial distance between the external gears 5 can be reduced to only the heightwise portion of the transmission gear 15, contributing to the fact that the reduction gear is made further shorter in the axial direction.

One end plate portion 6Y of the pair has a projecting portion 14 formed thereon, the projecting portion 14 being loosely fitted in the through hole 17 of the external gear 5. Here, the through hole 17 in the external gear 5 on the one end plate portion 6Y side is formed to be larger than the through hole 17 in the external gear 5 on the other end plate portion 6X side, and the projecting portion 14 projecting from the one end plate portion 6Y is loosely fitted in that through hole 17. A through hole 19 is formed in the other end plate portion 6X. The input gear 2 has an outer gear 24 and is inserted in the through hole 19 and the through hole 17, and its distal end portion is rotatably supported in a hole 22, which is formed in the projecting portion 14, through a shell-type needle roller bearing 16. As the distal end portion of the input gear 2 (i.e., which serves as an output gear of a motor) is supported by the bearing, it is possible to determine the center distance between an output shaft of the motor to which the input gear 2 (output gear of the motor) is fixed and the gear meshing therewith. Hence, there is no need to separately provide a rotational phase adjustment pin for installing the motor.

An oil seal 23 is provided between an outer periphery of the input gear 2 and the carrier. The rotation from the motor 1 (see FIG. 5) is transmitted to an input end portion of the input gear 2 on the oil seal 23 side.

An intermediate gear 50 has a spur gear body 51, a fixed shaft 52, and a cylindrical roller bearing 53, and is disposed so as to pass through a through hole 44 formed in the external gear 5 in its axial direction in such a manner as to be radially distanced from the center. Both ends of the fixed shaft 52 are fixed in a hole 54 formed in the carrier 6 at a position radially distanced from the center of the internal gear 4. The spur gear body 51 is rotatably supported by the fixed shaft 52 through the cylindrical roller bearing 53. Accordingly, the intermediate gear 50 is rotatably supported by the carrier 6 while meshing with the cylindrical gear 20 and the input gear 2. A pair of oil seals 30 are each provided between an outer periphery of each of both ends of the carrier 6 and an inner periphery of each of both ends of the internal gear 4.

Figure 4:
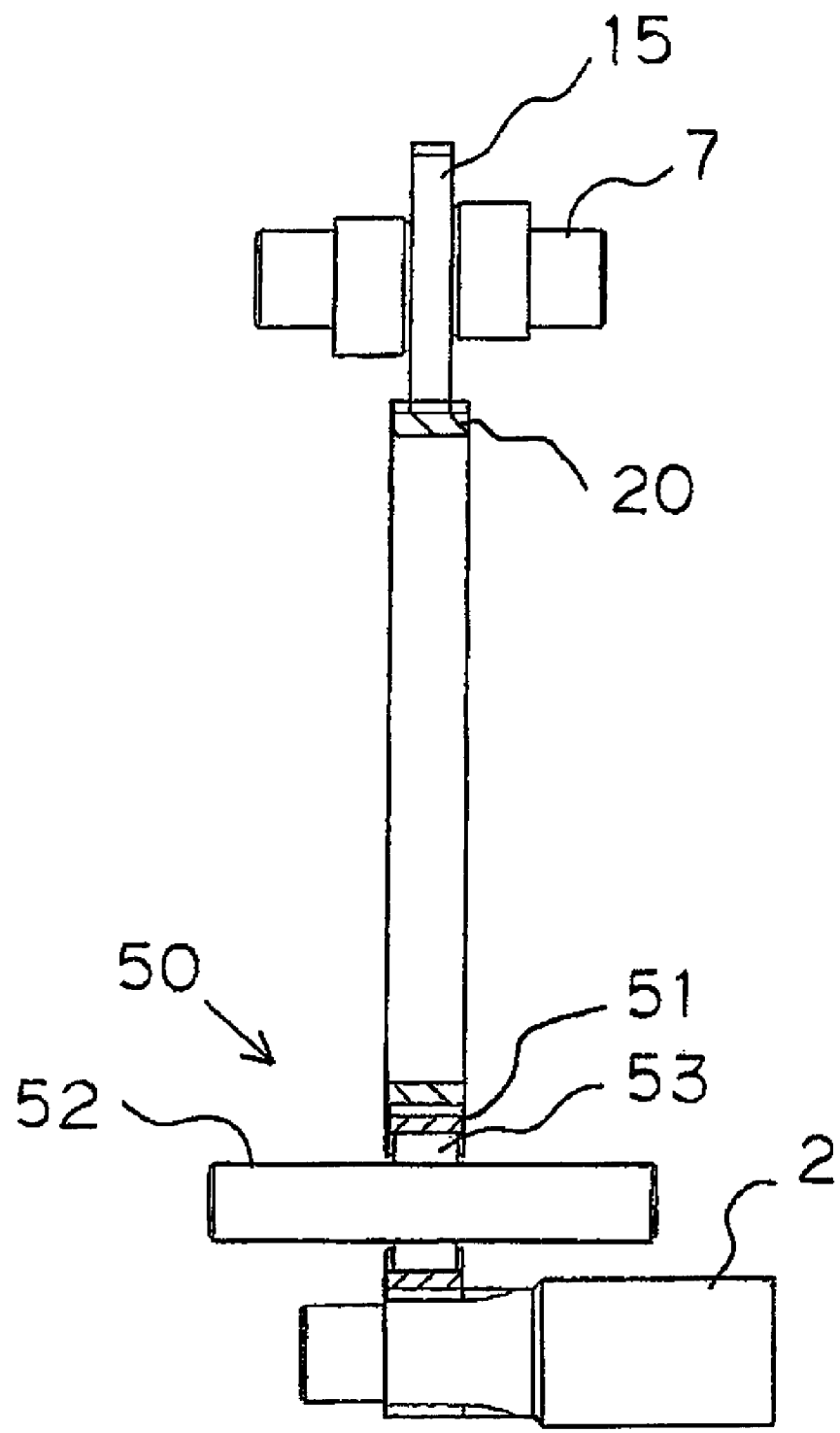
FIG. 4 is a diagram illustrating the meshing relationship among an input gear, an intermediate gear, a cylindrical gear, and a transmission gear of a crankshaft.

FIG. 4 is a diagram illustrating the meshing relationship among the input gear 2, the intermediate gear 50, the cylindrical gear 20, and the transmission gear of the crankshaft.

Figure 5:
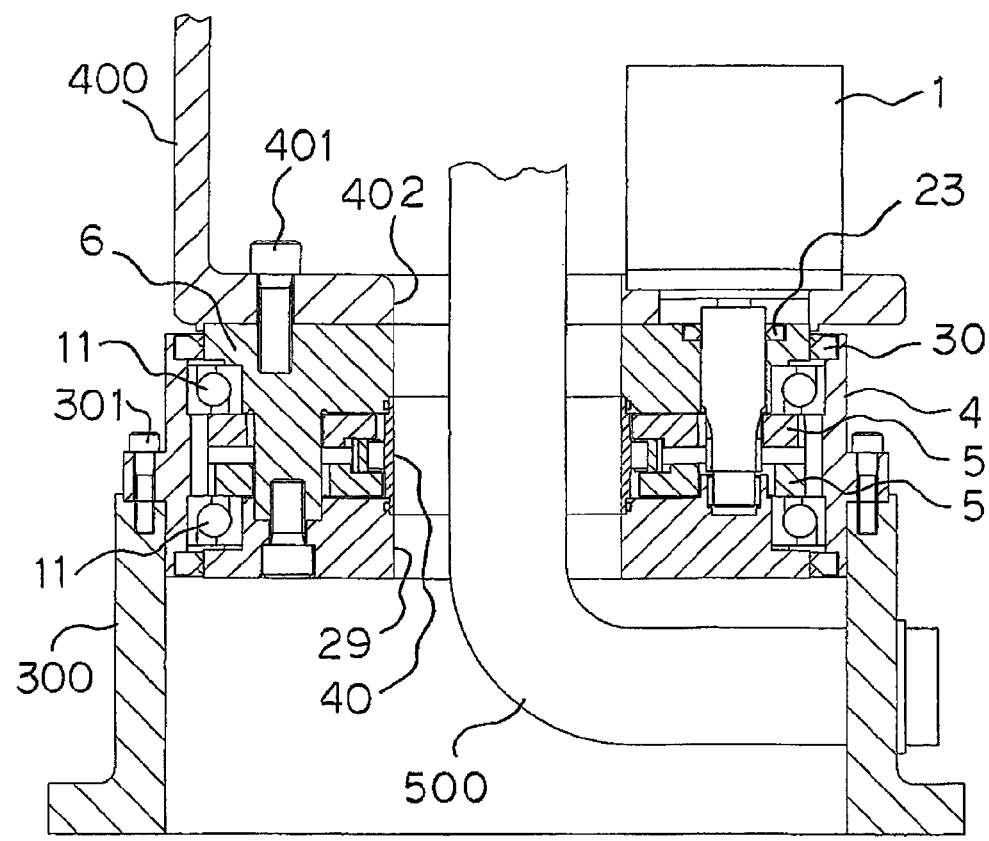
FIG. 5 is a diagram in which a gear device in accordance with the invention is applied to a turning portion structure of an industrial robot.

In FIG. 5, a turning portion structure 200 of an industrial robot is comprised of a fixed member 300 and a rotating member 400 which are connected to each other relatively rotatably through the gear device 100; and the motor 1 for relatively rotating the fixed member 300 and the rotating member 400 through the gear device 100. The motor 1 is fixed in a recessed portion of the rotating member 400 at a position offset from the rotational center of the relative rotation, the internal gear 4 of the gear device 100 is fixed to the fixed member 300 by bolts 301, and the carrier 6 of the gear device 100 is fixed to the rotating member 400 by bolts 401.

Wirings 500 such as electric wires, cables, signal lines, and pipings are passed through the interiors of a hole 402 formed in the rotating member 400, the hollow hole of the cylinder 40, and the hollow hole 29 of the carrier 6. If the members which are passed through these interiors are preferably not rotated, it is preferable to fix the carrier 6 and fetch the reduced rotation from the internal gear 4.

Next, a description will be given of the operation in accordance with the first embodiment. The speed reducing operation of the gear device 100 will be described briefly.

In the case where the carrier 6 is fixed, when the rotation from the motor 1 is transmitted to the input gear 2, the spur gear body 51 of the intermediate gear 50 and the cylindrical gear 20 are rotated. The rotation of the cylindrical gear 20 is transmitted to the transmission gears 15 of the crankshafts 7, and the crankshafts 7 cause the external gears 5 to undergo eccentrically oscillating motion relative to the internal gear 4. The internal gear 4 outputs reduced rotation due to the fact that the external gear 5 meshes with the internal gear 4. In the case where the internal gear 4 is fixed, the carrier 6 outputs reduced rotation.

Here, the overall gear device can be made compact since the cylindrical gear 20 is located on the radially inner side of the imaginary line passing through the center of rotation of each crankshaft 7 and is rotatably supported by the carrier 6, i.e., since the output gear 2 fixed to the output shaft of the motor 1 is in the form of having entered an axially central portion of the gear device 100.

In addition, since the intermediate gear 50 is rotatably supported by the carrier 6 so as to mesh with the input gear 2 and the cylindrical gear 20, the input shaft can be further offset radially outward, so that the gear device can be made such that the central hole can be made even larger.

In addition, since the intermediate gear 50 is constituted by the fixed shaft 52 fixed to the carrier 6 and the gear body 51 disposed rotatably around that fixed shaft 52, the supporting structure of the intermediate gear 50 can be made inexpensive.

In addition, since the oil seal 23 is provided between the input gear 2 and the carrier 6, it is possible to prevent the ingress of a lubricant from the gear device 100 to the motor 1 side.

In addition, since the protective tube 40 whose both ends are fixed to the carrier 6 is provided inside the cylindrical gear 20, it is possible to prevent the ingress of the lubricant into the hollow hole 29 provided in the gear device 100.

In addition, the motor 1 is fixed to the rotating member 400 at a position offset from the rotational center of the relative rotation, the internal gear 4 of the gear device 100 is fixed to the fixed member 300, and the carrier 6 of the gear device 100 is fixed to the rotating member 400. Therefore, a stable turning portion structure can be obtained in which the rotating member 400 is compact and the center of gravity is low.

(Second Embodiment)

Next, referring to a drawing, a description will be given of a second embodiment of the invention.

Figure 6:
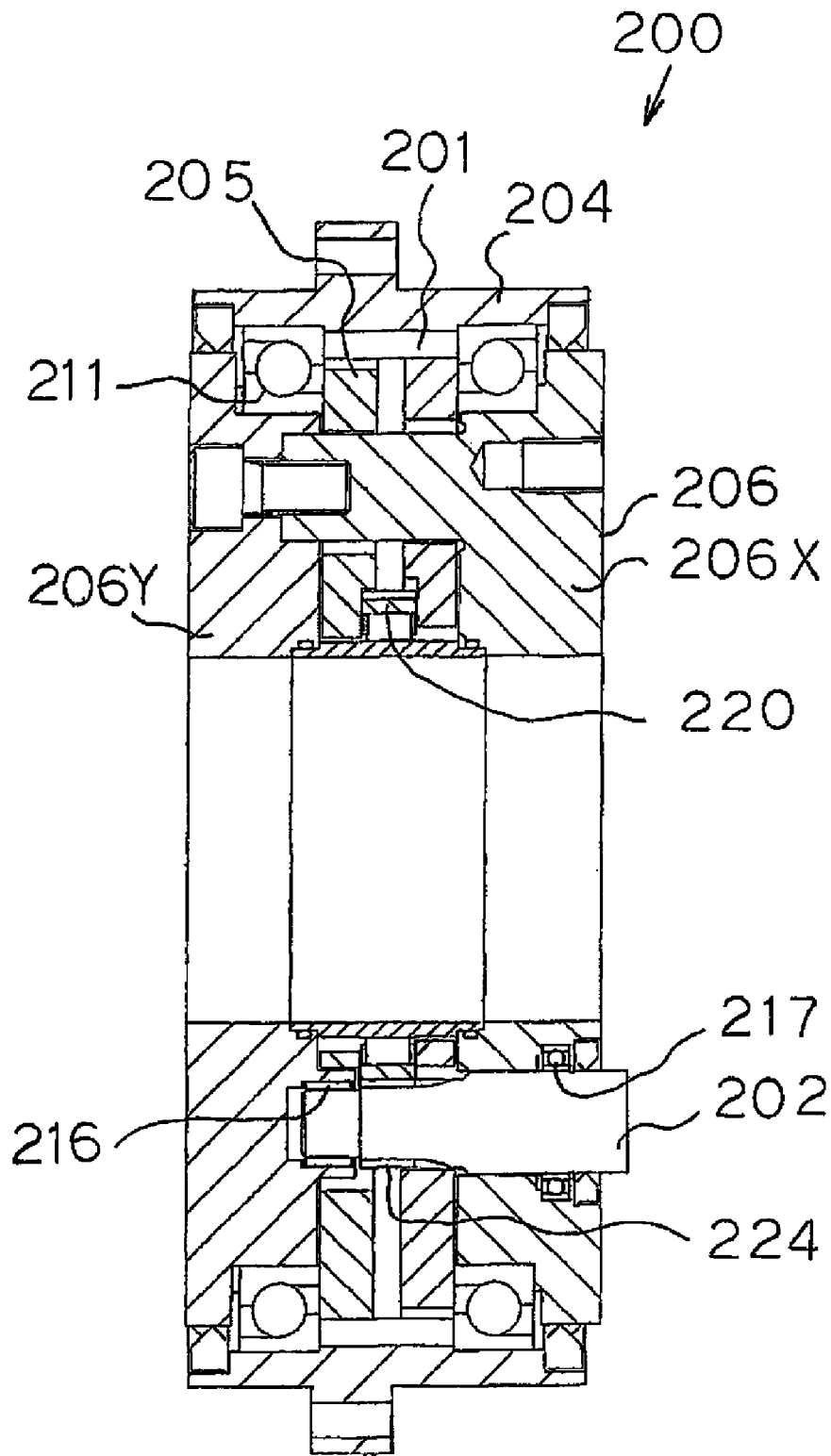
FIG. 6 is a cross-sectional view of a second embodiment in accordance with the invention.

In FIG. 6, a gear device 200 of an eccentrically rocking type has a form in which the intermediate gear 50 of the gear device 100 in accordance with the first embodiment is omitted, and its configuration other than that is substantially the same as the gear device in accordance with the first embodiment.

Namely, the gear device 200 of an eccentrically rocking type is comprised of an input gear (motor output gear) 202; an internal gear 204 having inner teeth consisting of a plurality of pins 201; two external gears 205 which rotate while revolving around a central axis of the internal gear 204 while meshing with the internal gear 204; a carrier 206 supported rotatably within the internal gear 204 through a pair of angular ball bearings 211 and adapted to rotate about the central axis of the internal gear 204 in conjunction with the rotation of the external gears 205; a plurality of crankshafts which are rotatably supported by the carrier 206 and are adapted to cause the external gears 205 to revolve around the central axis of the internal gear 204; transmission gears each provided on a central portion of each crankshaft; and a cylindrical gear 220 which meshes with the transmission gears of the respective crankshafts and also meshes with the input gear 202 to allow the rotation to be transmitted thereto.

The input gear 202 has an outer gear 224 meshing with the cylindrical gear 220 and is inserted in the carrier 206 and the external gears 205, and its distal end portion is rotatably supported by a carrier 206Y through a shell-type needle roller bearing 216, while its input side end portion is rotatably supported by a carrier 206X through a radial ball bearing 217.

Although the rotation from the motor is transmitted to the input end portion of the input gear 202, since both ends of the input gear 202 are thus supported, it is possible to fix a pulley to that input end portion and transmit the rotation from the motor to that pulley through a belt.

Next, a description will be given of the operation in accordance with the second embodiment. The gear device 200 has a form in which the cylindrical gear 220 can be rotated by omitting the intermediate gear 50 provided in the gear device 100 in accordance with the first embodiment, so that the gear device can be made inexpensive with a small number of component parts.

Although the present invention has been described above through the embodiments, the invention is not limited to the same, and various modifications are possible within the scope of the technical concept of the invention. For example, although the transmission gears 15 and the cylindrical gear 20 are disposed in such a manner as to be sandwiched by the two external gears 5, these gears may be disposed in such a manner as to be sandwiched by the external gear 5 and one of the pair of end plate portions 6. Further, the forms of the bearings in the embodiments are illustrative, and are not limited to the same.

Industrial Applicability

The present invention can be used in gear devices of the eccentrically rocking type which are used in all industries. The present invention is optimally suited, in particular, to gear devices of the eccentrically rocking type which are used in joint portions of industrial robots, turning table apparatuses, and automatic tool replacement apparatuses of machine tools.

The invention claimed is:

1. A gear device comprising:
an input gear fixed to an output shaft of a motor and disposed by being distanced from a central axis;
an internal gear;
an external gear which rotates while revolving around a central axis of the internal gear and meshing with the internal gear;
a carrier supported rotatably within the internal gear and adapted to rotate about the central axis of the internal gear in conjunction with the rotation of the external gear;
a plurality of crankshafts which are rotatably supported by the carrier and are adapted to cause the external gear to revolve around the central axis of the internal gear;
transmission gears each provided on a central portion of each of the crankshafts; and
a cylindrical gear which meshes with the transmission gears of the crankshafts and to which rotation is transmitted from the input gear,
wherein the cylindrical gear is located on a radially inner side of an imaginary line passing through a center of rotation of each crankshaft and is rotatably supported by the carrier, and
wherein the input gear and the cylindrical gear are disposed in an axially central portion of the carrier, and the rotation is transmitted from the input gear to the cylindrical gear.

2. The gear device according to claim 1, wherein an intermediate gear which is rotatably supported by the carrier is disposed so as to mesh with the input gear and the cylindrical gear.

3. The gear device according to claim 2, wherein the intermediate gear is constituted by a shaft fixed to the carrier and a gear disposed rotatably around the shaft.

4. The gear device according to claim 1, wherein an oil seal is provided between the input gear and the carrier.

5. The gear device according to claim 1, wherein a protective tube whose both ends are fixed to the carrier is provided inside the cylindrical gear.

6. The gear device according to claim 1, wherein a recessed portion is formed on an opposing surface side of the external gear, and the cylindrical gear is accommodated in a space surrounded by the recessed portion.

7. A turning portion structure of an industrial robot using the gear device according to claim 1, comprising:
a fixed member and a rotating member which are connected to each other relatively rotatably through the gear device; and
the motor for relatively rotating the fixed member and the rotating member through the gear device,
wherein the motor is fixed to the rotating member at a position offset from the rotational center of the relative rotation, the internal gear of the gear device is fixed to the fixed member, and the carrier of the gear device is fixed to the rotating member.

* * * * *